Sept. 13, 1966 R. W. SHREWSBURY 3,272,205

CARD SELECTOR

Filed July 2, 1964 4 Sheets-Sheet 1

INVENTOR.

RAYMOND W. SHREWSBURY

BY

Carpenter, Abbott, Coulter & Kinney

ATTORNEYS

INVENTOR.
RAYMOND W. SHREWSBURY
BY
Carpenter Abbott Coulter & Kinney
ATTORNEYS

Sept. 13, 1966 R. W. SHREWSBURY 3,272,205

CARD SELECTOR

Filed July 2, 1964 4 Sheets-Sheet 3

INVENTOR.
RAYMOND W. SHREWSBURY
BY
Carpenter Abbott Coulter & Kinney
ATTORNEYS

INVENTOR.
RAYMOND W. SHREWSBURY
BY
Carpenter, Abbott, Coulter & Kinney
ATTORNEYS United States Patent Office
3,272,205
Patented Sept. 13, 1966

3,272,205

CARD SELECTOR

Raymond W. Shrewsbury, Roseville, Minn., assignor to Minnesota Mining and Manufacturing Company, St. Paul, Minn., a corporation of Delaware Filed July 2, 1964, Ser. No. 379,890
10 Claims. (Cl. 129—16.1)

This invention relates to a light projection apparatus and in one aspect, relates to an apparatus for projecting collimated light simultaneously and transversely through a deck of translucent information bearing cards such that cards bearing particular information may be effectively sorted from the remainder of said cards bearing different information.

The apparatus made in accordance with this invention is utilized in a new and novel system for information storage and retrieval. The apparatus is particularly adapted for retrieving purposes and basically includes means for producing a beam of generally parallel light and directing the same along a predetermined path, means for supporting at least one information bearing card in the path of said light with a predetermined portion of a predetermined edge of said card substantially normal to and in the path of the beam of light whereby the beam of light will enter the predetermined edge of said card at the predetermined portion to pass therethrough and be reflected in the body of the card if an information bearing mark has previously been made therein in a location related to the said predetermined portion, and including means arranged along a second edge of the card for determining the location along the second edge at which the reflected light emerges.

The specific structural elements of this combination may assume various configurations and additional features may be combined therewith to afford optimum utility for retrieval purposes.

The information bearing card used in the information storing system to which the present invention relates is a thin, generally rectangular member formed of translucent polymeric material, preferably unoriented polystyrene. By a new technique the structure of the material can be disturbed in a controlled manner to form areas of optical irregularity or areas having a refractive index greater than the normal index for the material. These areas are referred to as craze marks and are formed on the card in a predetermined code pattern based on a rectangular coordinate system. The craze mark made in the card body is not visible when viewing either face of the card and this permits micro images to be located any place on the faces of the card without interference by the marks and in turn do not disturb the value of the marks.

The retrieval system to which the present invention relates must provide means for directing light at one edge of the card toward the craze mark, from which it will be reflected out of the card at a point along the same or a different edge and thus locate the marks or in the alternative, locate cards which have a mark causing light to be visible at a particular coordinate point.

The card adapted for use in the apparatus of the present invention is of the type disclosed and claimed in the copending application of Raymond W. Shrewsbury, Serial No. 379,828, filed of even date and assigned to the assignee of the instant application and the particular information storage and retrieval system is disclosed and claimed in the copending application of Robert L. Rutledge and Raymond W. Shrewsbury, Serial No. 379,886, filed of even date herewith, and assigned to the assignee of the instant application.

The present invention provides a retrieval component for sorting information bearing cards and provides the unique advantage of being able to sort for more than one code mark at a time.

The present invention provides an apparatus by which light may be controlled to project through a translucent card at various intevals along one edge thereof being directed out of the card along a different edge.

Another advantage of the present invention is the provision of an apparatus which is adapted for use with a plurality of cards and which has associated therewith a shutter control system to rapidly and effectively control the shutter operation to perform various retrieval steps.

A further advantage of the present invention is in the provision of means for easily and rapidly picking a card from a plurality of such cards arranged face to face so the same may be viewed for the purpose of gaining all the instructive matter which may be imparted thereto.

These and other advantages of the present invention will become more apparent after a reading of the following description which relates to the accompanying drawings, illustrating a preferred embodiment and a modification thereof, wherein.

Figure 1:
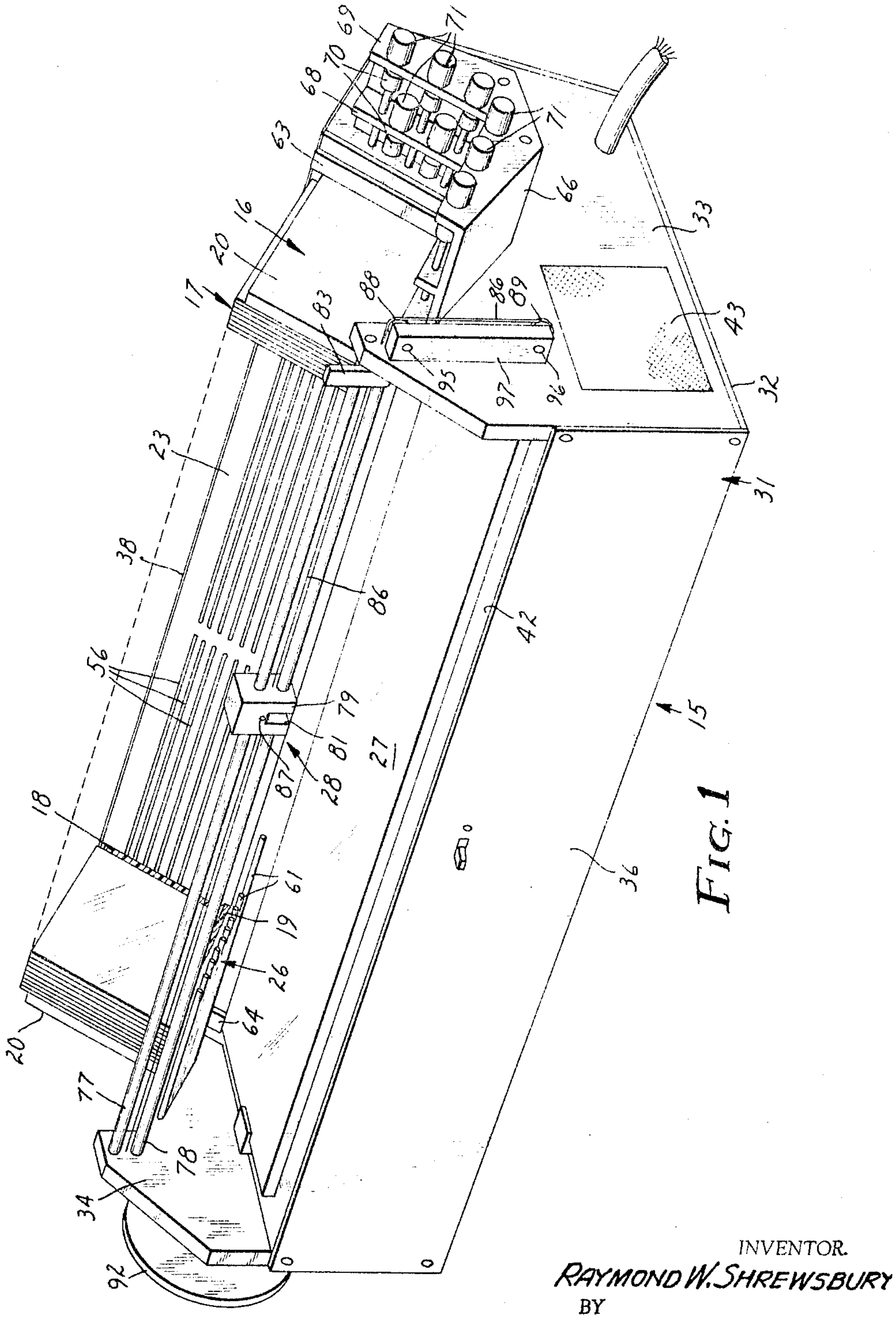
FIGURE 1 is an isometric view of an apparatus constructed in accordance with the present invention.
Figure 2:
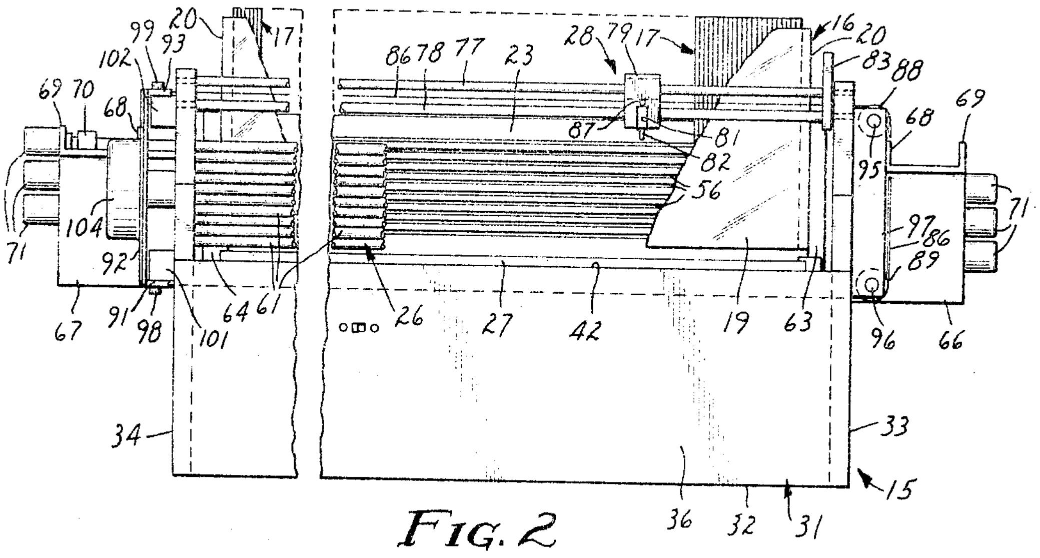
FIGURE 2 is a front elevational view of the apparatus of FIGURE 1.
Figure 3:
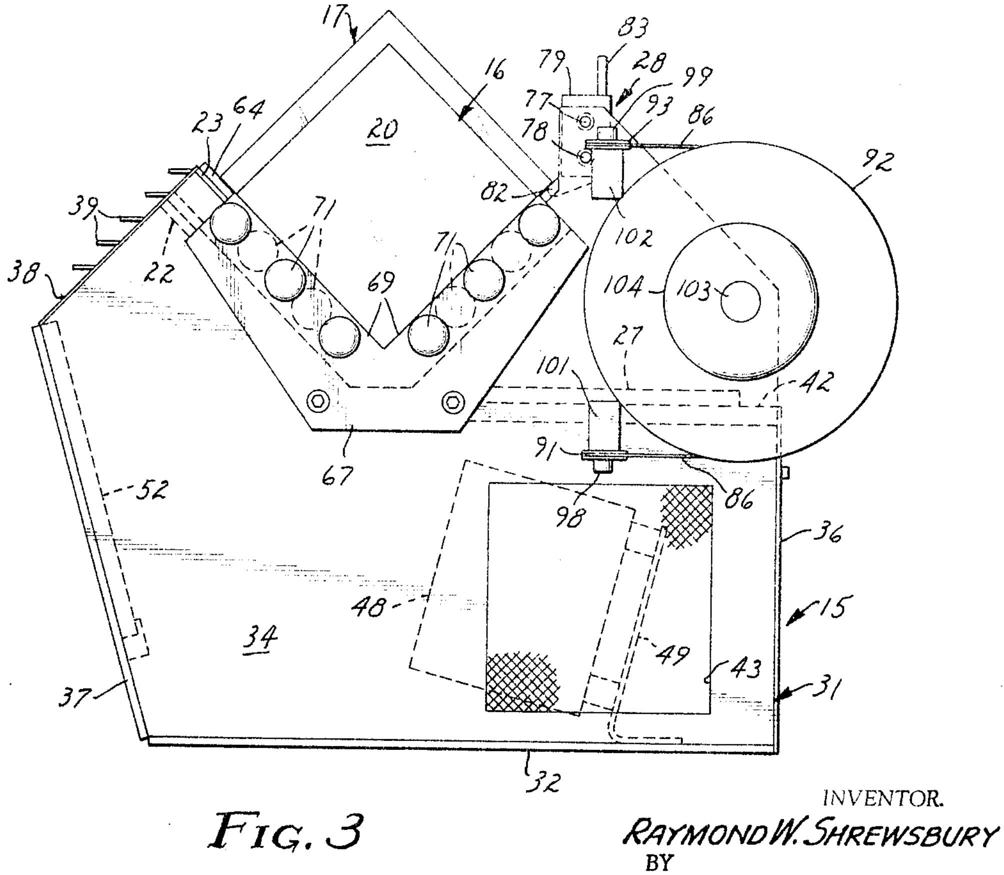
FIGURE 3 is a left end elevation of the apparatus as viewed in FIGURE 1.
Figure 4:
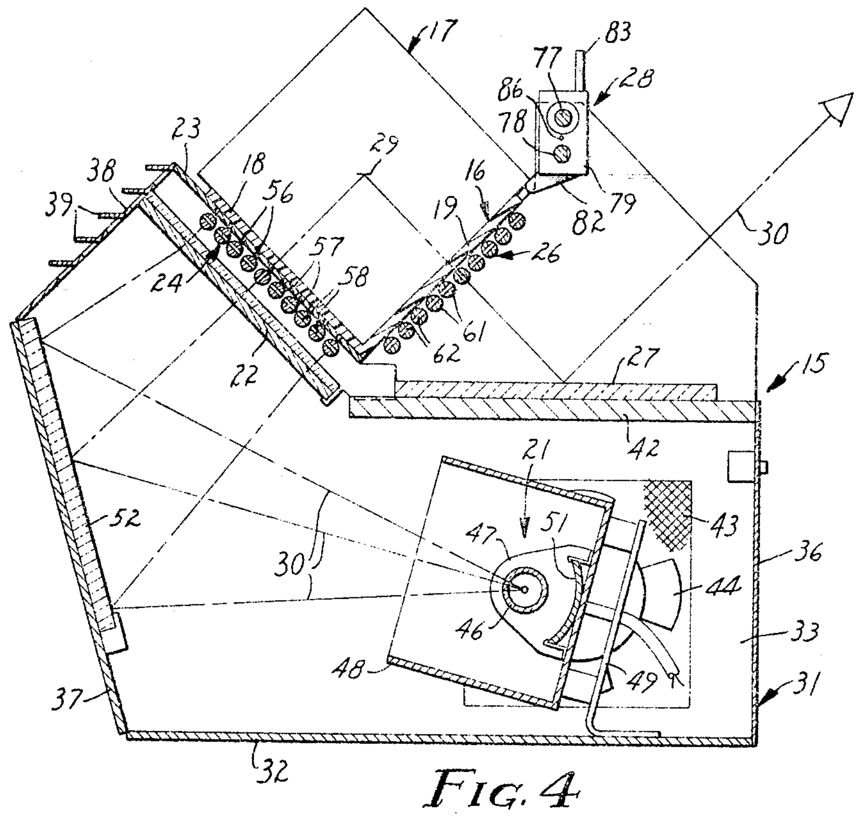
FIGURE 4 is a vertical transverse sectional view of the apparatus of FIGURE 1.

Referring now to the drawing, in particular, FIGURES 1, 2 and 3, a sorting and retrieving machine is illustrated, generally designated 15, which is adapted to receive a tray 16 containing a plurality of rectangular card-like members 17 formed of translucent polymeric material. The tray 16 is formed of transparent material and comprises a pair of bottom members 18 and 19, joined in the form of a trough, and identical square end plates 20.

The machine 15 comprises a light source 21, condensing lens means 22, a diaphragm 23, a first array of shutters 24 disposed between said light source and said diaphragm to control the passage of light through the apertures thereof, a second array of shutters 26, an observer viewing glass 27, and a card displacing mechanism 28.

Figure 5:
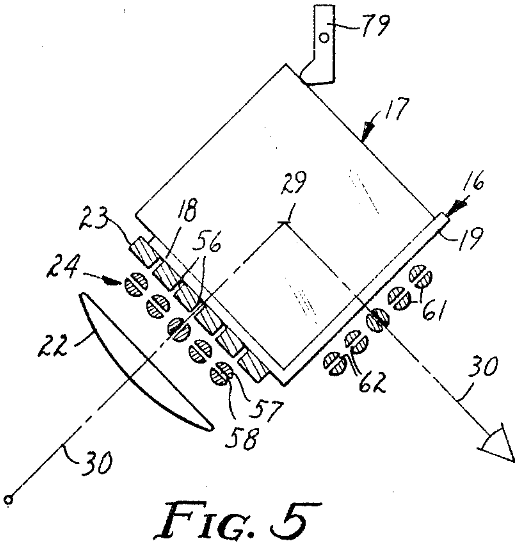
FIGURE 5 is a diagrammatic view illustrating the function of the apparatus.

As illustrated diagrammatically in FIGURE 5 light from the source 21 is collected by the lens means 22 which will direct substantially parallel light rays or collimated light toward the first array of shutters 24. The shutters interrupt the beam of collimated light and allow it to pass through only open ones of said shutters (the middle shutter as illustrated) toward the diaphragm 23 and through a corresponding slotted aperture 56 formed therein. The band of light passing through the diaphragm impinges on one edge of the information storage cards 17. The band of light is substantially normal to the edge of the cards and the refractive index of the cards is such that the light rays are refracted only very slightly. The light travels along a path through each card until it strikes a craze mark 29 formed within the material of a card causing the light to be refracted or reflected (as indicated by the ray 30) on through the card at a considerably different angle until it emerges from a different side or the viewing edge of the card. As the light passes out through the viewing edge of the card a second array of shutters 26 are so positioned along said viewing edge to permit only desired portions of the deflected light to be visible to the observer. The open shutter is determined by the code mark to be sorted and the corresponding coordinate. If light passes through an open shutter this signifies that a craze mark or optical discontinuity has been formed in a particular card at a particular coordinate point and that said particular card bears the information desired. This card is then removed from the row of cards by operation of the card displacing mechanism 28. When it is desired to search a row of cards for more than one craze mark at a time appearing on a single card it is necessary to provide means for controlling sequential opening and closing of desired shutters at a rate such that only cooperating shutters from each array will be opened at any one given time but that the two pair of corresponding shutters will open and close at a rate such that the observer has the visual sensation that steady light is flowing through the two areas at the same time. Scanning the row of cards looking for a card where light is passing through in these two points in one given card is then relatively easy and when locating such a card the operator can displace the same. This shutter operation will be defined as this description proceeds.

In the embodiment illustrated in FIGURES 1 through 10, the machine 15 includes a frame comprising opposed irregularly shaped end walls 33 and 34 joined by a base plate 32, a front panel 36, a first back wall 37, a second back wall 38 formed with louvers 39, the diaphragm 23, and a horizontally disposed top panel 42 which joins the front panel 36 and the diaphragm 23. Each of the end walls 33 and 34 are formed with a grill 43 serving as an exhaust opening for a conventional cooling fan 44 disposed within the frame 31. The light source 21 is disposed within the frame 31 beneath the top panel 42 and is secured to the base plate 32. The light source comprises a lamp 46, which is preferably an iodine filled incandescent lamp which is supported between a pair of ceramic lamp holders, only one of which is shown at 47, and enclosed within a tubular shroud 48 mounted on a suitable L-shaped bracket 49. A reflector 51 is positioned in the lamp housing behind the lamp 46. Light from the lamp 46 impinges upon a reflector, in the form of a mirror 52, mounted on the back wall 37 which directs the light to the lens means 22. The lens means 22 comprises segments of a pair of fresnel lenses fitted together and having a focal length such that the light passing therethrough is generally collimated. In the illustrated embodiment the machine 15 is quite long in the lengthwise dimension and is provided with two identical folded light paths including two light sources and dual sets of lens means adapting the machine for use with a greater number of cards at one time. An elongated light source which could extend the length of the box and a single means for effecting substantially collimated light would be a preferred construction if the same could be economically produced.

The shutters of the arrays 24 and 26 take the form of a plurality of elongated rods 57 and 61 respectively, which are bearinged in the end walls 33 and 34 and are formed intermediate their ends with elongate diametrically and axially extending slots 58 and 62 respectively. Upon rotation of the rods disposing one of the slots therein in a position permitting the passage of the light rays therethrough, the light is then able to pass also through the corresponding slotted aperture 56 formed in the elongate diaphragm 23. The rods are small and the apertures 56 in the diaphragm 23 are narrow which results in a very narrow band of light striking a row of cards and the light passing through a single card is a very small beam. As an illustrative example, the rods 57 and 61 may have a diameter of 0.203 inch and the slots 58 and 62 may have a width of 0.094 inch, with the apertures in the diaphragm having a width of 0.062 inch.

The first array of shutters 24 as illustrated, include ten shutter rods 57 and are arranged in a bank or parallel arrangement with respect to each other with their axes equally spaced. The second array of shutters 26 comprise ten shutter rods 61 which are also parallel in extent and equally spaced from each other and as illustrated, are positioned in a bank having an angular relationship of 90° with respect to the plane of the bank formed by the first array of shutters. The card tray 16 is adapted to be placed between the banks of shutters 24 and 26 and is suitably supported on the diaphragm 23 between vertically disposed bars 63 and 64 secured to said diaphragm adjacent each end thereof.

Bracket means 66 are fixedly mounted on the end wall 33 (as shown most clearly in FIGURE 1) and similar bracket means 67 are secured to the end wall 34. These brackets are formed to rotatably receive the end portions of every other one of the shutter rods of each array respectively. The bracket 66 includes two vertically positioned and transversely spaced generally V-shaped plates 68 and 69. The plate 68 is formed with a plurality of openings to receive therethrough five of the shutter rods 57 and five of the shutter rods 61. A collar 70 is fitted on two of the rods in each group between the end wall 33 and the plate 68. The collars 70 serve to connect the rods to rotary solenoids 71 mounted on the opposite side of the plate 68 and extending through aligned openings formed therein. The collars 70 also serve to prevent axial displacement of the shutter rods. The other three rods of each set which extend through the outer plate 69 on the brackets 66 and 67 are also provided with collars 70 and rotary solenoids 71 disposed on opposite sides of the plates 69.

Figure 7:
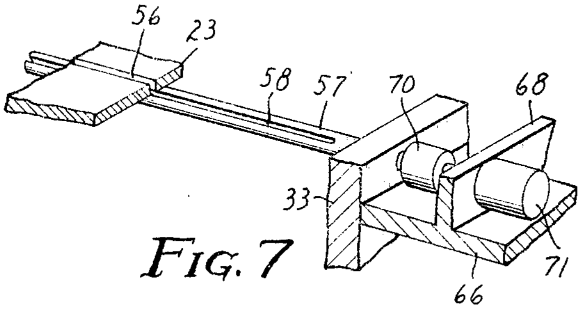
FIGURE 7 is a detailed perspective view of a shutter and control therefor.

FIGURE 7 illustrates on an enlarged scale the relationship of the rods and solenoids and shows the end of one shutter rod 57, a portion of the bracket 66 together with the end wall 33, the vertical plate 68 and a small portion of the diaphragm 23 with its associated slotted aperture 56.

The observer's glass 27 is mounted on the top panel 42 in a generally horizontal position and takes the form in the illustrated embodiment of a mirror. This mirror permits the observer to identify the position of the small dots of light which pass through the cards and through the second array of shutters 26. The mirror enables the shutters to be positioned in the trough-like manner with respect to each other and yet permits the observer to easily view the second set of shutters. This mirror further facilitates the positioning by the operator of the card displacing mechanism 28 which will now be described.

Figures 8, 9, 10:
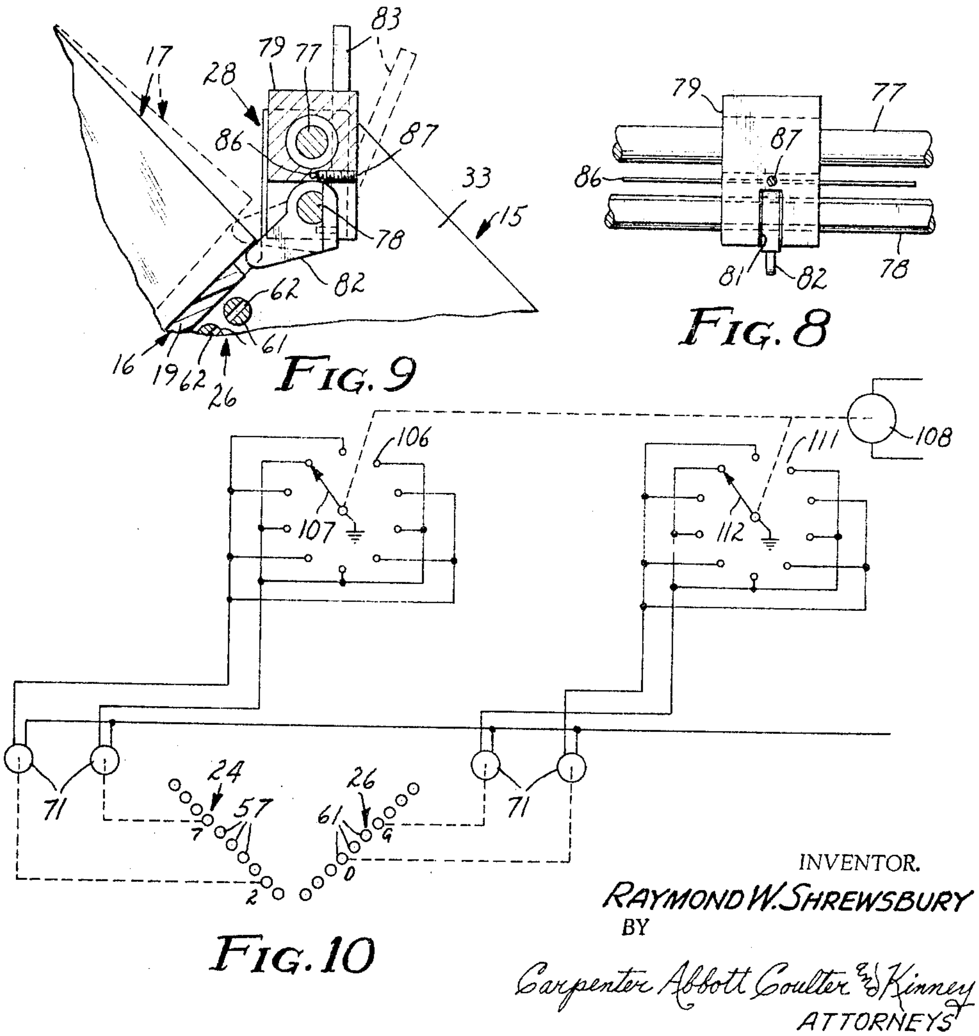
FIGURE 8 is a detailed view of the card displacing mechanism.
FIGURE 9 is an end view of the card displacing mechanism shown in FIGURE 8.
FIGURE 10 is a schematic electrical diagram of a circuit for controlling the shutters of the apparatus illustrated in FIGURE 1.

As shown in FIGURES 1, 2, 3, 8 and 9 the card displacing mechanism 28 includes a pair of guide rods 77 and 78 which extend between the ends walls 33 and 34 in vertically disposed parallel relationship to each other and above the observer glass 27. A carriage 79 is mounted on the rods and slidable therealong between the end walls. The carriage 79 is generally cubed-shaped and is formed at its lower extremity with a transversely extending slot 81 of a size sufficient to receive therein an arm 82 which fits about the lower guide rod 78 and terminates in a free end portion having an axial dimension not greater than the thickness of a single card 17. The lower guide rod 78 is formed with a flattened axially extending surface and the arm 82 has the opening therein formed to fit the rod such that upon rotation thereof the arm 82 is rotated and at the same time permitting axial movement of the arm 82 along the rod 78 upon movement of the carriage 79. Rotation of the rod 78 to lift a card from the row, as shown by the broken line in FIGURE 9 is effected by a radially projecting lever 83 which is secured to said rod 78 at a position adjacent the right end wall 33. Movement of the carriage across the rods 77 and 78 is effected by a cord 86, secured to the carriage 79 by a set screw 87 (see FIGURE 8) which extends between said guide rods, through the end wall 33, over a pair of pulleys 88 and 89, back through the end wall 33, to and through the end wall 34, around a pulley 91, which is positioned on a vertical axis, around a rotatably mounted drive pulley 92 to an upper pulley 93 which directs the cord through the end wall 34 back to the other side of the carriage. The pulleys 88 and 89 are suitably mounted for rotation on generally horizontally extending shafts 95 and 96, secured to a bracket 97 fixed on the right end wall 33. The pulleys 91 and 93 are mounted for rotation on vertically extending shafts 98 and 99 supported on the end wall 34 by suitable brackets 101 and 102 respectively. The drive pulley 92 is mounted for rotation with respect to the end wall 34 on a suitable shaft 103 and has formed thereon an axially extending knob 104, the surface of which is knurled to be gripped by the operator and rotated, thus imparting movement of the cord 86 about its pulleys such that the carriage 79 traverses the guide rods 77 and 78 to any desired position therealong.

FIGURE 10 diagrammatically illustrates a circuit by which the shutters in the array 24 and the array 26 can be controlled in a desired sequence permitting thereby the sorting of cards bearing craze marks at particular coordinate code positions. In the illustrated example to sort cards bearing craze marks at coordinate points corresponding to the position of shutter 2 of the first array 24 and shutter D of the second array 26 and to the position of shutter 7 of array 24 and shutter G of array 26, the corresponding rotary solenoids 71 for the 2nd and 7th shutter of array 24 are connected to alternate contacts of a rotary switch 106 having a wiper blade 107 driven from a variable speed motor 108. The rotary solenoids 71 for the shutters D and G of array 26 are connected to alternate contacts of a rotary switch 111 having a wiper 112 driven from the same motor 108. Thus when shutter 2 is open, shutter D will be open (all others being closed under the normal bias of the spring within the rotary solenoids 71) and when shutter 7 is open, shutter G will also be opened (all others closed) simultaneously due to the position of the wipers 107 and 112.

A plug board or panel (not shown) connected to the solenoids and contacts permits the rapid sequencing of shutter operation from the two arrays of shutters such that any desired coordinate combination may be easily provided to facilitate rapid sorting of the cards 17.

Figure 11:
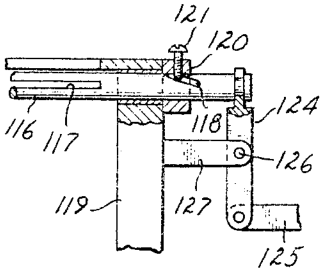
FIGURES 11 and 12 are detail views showing a modified form of a shutter control.
Figure 12:
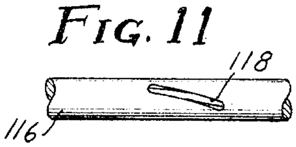
Figure 6:
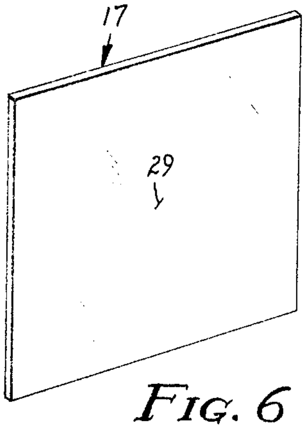
FIGURE 6 is an isometric view of a card usable in the apparatus of FIGURE 1.

An alternative embodiment for shutter control is illustrated in FIGURES 11 and 12. In this embodiment the shutter rod 116 is formed in much the same manner as either the shutter rods 57 or 61 except that the ends which project through the end walls, such as the wall 119, are formed with a helical slot 118 (see FIGURE 12) in the surface thereof permitting rotation of the shutter through an angle of about 27° upon axial movement of the rod. A bracket 120 is formed on the end wall 119 and has a pin 121 extending therethrough and into the slot 118. Axial movement of the rod 116 imparts rotational movement thereto to open or close the shutter by aligning the slot 117 in the rod 116 with the corresponding slot in a diaphragm. Axial movement of the rod is effected by a lever 124 connected to the rod 116 at one end thereof and to a link 125 at the other end thereof. Intermediate its ends, the lever 124 is fulcrumed on a pivot 126 fixed on a bracket 127. The link 125 may be moved toward and away from the wall 119 by connection of the opposite end thereof to a rotary cam, pitman wheel or solenoid, operation of which could control the shutter. The link 125 is biased to a normal position at which the slot 117 in the rod 116 is not aligned with the slot in the diaphragm thus closing the shutter. The lever 124 is connected to the rod 116 in such a manner that rotational movement between said rod and lever is permitted as well as light pivotal movement.

Having thus defined the present invention in terms of a preferred embodiment of an apparatus and one slight modification thereof, it is to be understood that various other changes and modifications may be made without departing from the scope of the invention, e.g., the interrupted light may be afforded by means of a flashing light source, and the location at which reflected light may emerge from an information bearing card may be determined by a scale or by interception by an electro-optical sensing device.

What is claimed is as follows:

1. An apparatus for retrieving information from information bearing cards by directing light through said cards wherein each card has at least one optical discontinuity area in the body of the card arranged in some predetermined coded order whereby light is deflected by said optical discontinuity area, said apparatus comprising:

means for producing a beam of generally parallel light and directing the same along a predetermined path,
means for supporting at least one of said cards in the path of said light with a predetermined portion of a predetermined edge of a said card substantially normal to and in a said beam of light whereby said beam of light will enter said predetermined edge of said card at a predetermined location to pass therethrough, and
means arranged along a second edge of a said card for determining the location along said second edge at which said deflected light emerges.

2. An apparatus for sorting and retrieving information bearing cards by directing light through a plurality of said cards wherein each card has at least one optical discontinuity area in the body of the card arranged in some predetermined coded order whereby light is deflected by said optical discontinuity area, said apparatus comprising:

means for producing a beam of generally parallel light and directing the same along a predetermined path,
means for interrupting said beam of light,
means for supporting a plurality of said cards in a row in the path of said light with a predetermined edge of each of each said card substantially normal to and in a said beam of light whereby light can enter the edges of said cards when uninterrupted to be transmitted therethrough, and
means for interrupting light deflected within any said card positioned transverse to a second edge of said cards.

3. An apparatus for sorting and retrieving information bearing cards by directing light through a plurality of said cards wherein each card has at least one optical discontinuity area in the body of the card arranged in some predetermined coded order whereby light is deflected by said optical discontinuity area, said apparatus comprising:

means for producing a beam of generally parallel light and directing the same along a predetermined path, support means for supporting a plurality of cards arranged in a row in the path of said light beam with a predetermined edge of each of said cards substantially normal to the path of a said beam of light whereby light will enter said predetermined edges of said cards to be transmitted therethrough, means positioned between said means for producing light and said support means for interrupting said beam of light, means for interrupting light deflected within any card in a said row and positioned transverse to a second edge of the cards, and means movable along said support means to displace predetermined ones of the cards from the remainder of the cards in a said row.

4. An apparatus for sorting and retrieving cards bearing information wherein a coded marking system for the cards is utilized to identify particular ones of said cards bearing particular classes of information, said apparatus comprising means for supporting a row of said information bearing cards in face to face relation, a light source, a plurality of shutters extending along the row of cards, lens means for collecting and directing light from said source along a path in generally parallel relation toward said shutters, means for opening and closing said shutters to control the light passing therethrough and impinging upon one edge of each of said cards in a said row, means positioned adjacent said card supporting means to permit an observer to view a second edge of said cards, and means movable along the row of cards and engageable therewith for removing selected ones of said cards from said row.

5. An apparatus for projecting a light beam through at least one translucent polymeric body formed with one or more controlled areas having a refractive index different from that in the remaining areas comprising a light source, a diaphragm having at least one slotted aperture formed therein, means for collecting light from said source and directing the same in substantially parallel rays toward said diaphragm, a shutter positioned with respect to said at least one aperture in said diaphragm to control the passage of light therethrough, at least one second shutter arranged in a predetermined relationship with respect to said first mentioned shutter, means for controlling the shutters to permit light to pass therethrough when directed thereon, and means for supporting a said body such that an edge thereof traverses said aperture and is positioned between said shutters to allow light emitted from the aperture in said diaphragm to enter the edge of a said body.

6. An apparatus for projecting a light beam through at least one translucent polymeric body formed with one or more controlled areas having a refractive index different from that in the remaining areas comprising a light source, a diaphragm having at least one slotted aperture formed therein, means for collecting light from said source and directing the same in substantially parallel rays toward a said diaphragm, a shutter including a circular rod rotatably mounted on an axis in parallel aligned relation with said aperture and having an elongate diametrically and axially extending slot formed therein such that upon rotation of said rod said slot may be aligned with said aperture in the light path allowing light to pass therethrough and through said aperture and may block light from passing through said aperture upon further rotation thus controlling the passage of light through said aperture, at least one second shutter arranged in a predetermined relationship with respect to said first mentioned shutter, means for controlling the shutters to permit light to pass therethrough, and means for supporting a said body such that an edge thereof traverses said aperture and is positioned between said shutters to allow light emitted from the aperture in said diaphragm to enter the edge of a said body.

7. An apparatus for projecting a plurality of generally parallel light beams spaced in a predetermined order through a translucent polymeric card-like body formed with preformed areas having a refractive index different from that in the remaining areas of the body comprising a light source, a diaphragm having a plurality of parallel spaced slotted apertures formed therein, means for collecting light from said source and directing the same in substantially parallel rays toward said diaphragm, a shutter associated with each of said apertures and positioned between said diaphragm and said light source to selectively control the passage of light through said apertures, a plurality of second shutters arranged in a predetermined relationship with respect to said first mentioned shutters, means for controlling the position of the shutters to permit light to pass selectively therethrough in accordance with a predetermined order, and means for supporting an assortment of said bodies transversely to said apertures and between said shutters to allow light emitted from selected ones of said apertures in said diaphragm to strike an edge of each body.

8. An apparatus for directing light through a plurality of solid translucent polymeric card-like members formed with areas of optical discontinuity therein arranged in a predetermined pattern and having an index of refraction different from that of the remaining areas, whereby light is deflected by said areas of optical discontinuity, comprising a light source, means for collecting light from said source and directing the same substantially parallelly in a predetermined path, a diaphragm having a plurality of apertures formed therein in a predetermined pattern, first shutter means associated with said diaphragm to allow the passage of light through selected apertures, support means for a plurality of said card-like members, second shutter means positioned in a predetermined coordinate arrangement with respect to said first shutter means and with a surface of said members to receive light deflected thereby, and means for opening and closing said first and second shutter means in predetermined sequence to permit light to pass through a plurality of said members in a predetermined coordinate relationship to permit the location of predetermined ones of said members having said controlled areas in a predetermined order, and means engageable with said members to displace predetermined ones of said members from the remainder of said members.

9. An apparatus for sorting and retrieving information bearing cards wherein a light beam is used for sorting cards which bear a particular identifying mark comprising a light source, lens means for intercepting light from said source and directing the same along a path in generally rays, a diaphragm having a plurality of slotted apertures formed therein and disposed in said light path, a series of shutters cooperating with each of said slotted apertures for controlling the passage of light therethrough, means for supporting an assortment of said cards in face to face relation in the path of said light with the edges of said cards traversing said slotted apertures, a second series of shutters positioned in parallel spaced relation and positioned in a predetermined coordinate arrangement with respect to said first mentioned shutters, means for controlling the operation of selected ones of said shutters in a predetermined sequential order to define coordinate points therebetween and at a predetermined speed to afford passage of light through said shutters and into an edge of a said assortment of said cards, and a card displacing means movable along said supporting means for said cards for displacing certain ones of said cards from said assortment.

10. In an apparatus for directing light through a plurality of solid translucent polymeric card-like members formed with controlled areas therein arranged in a predetermined pattern and having an index of refraction distinct from that of the remaining areas comprising a light source, lens means for collecting light from said source and directing the same substantially parallelly in a predetermined path, a diaphragm having a plurality of apertures formed therein in a predetermined pattern and disposed with respect to said lens means to be in said path, first shutter means associated with said diaphragm to allow the passage of light through selected apertures, support means for a plurality of said card-like members, a second shutter means positioned in a symmetrical arrangement with respect to said first shutter means to define a coordinate pattern, and means for opening and closing said first and second shutter means in predetermined sequence at selected intervals to permit light to pass through said card-like members at predetermined coordinate locations affording the location of predetermined ones of said members having said controlled areas in said predetermined coordinate locations, and means movable along said support means to displace predetermined ones of said members from the remainder of said members.

No references cited.

JEROME SCHNALL, *Primary Examiner.*